Dec. 7, 1965

J. A. HESEN 3,222,084

WHIPLASH-PREVENTING SAFETY DEVICE

Filed May 27, 1964

INVENTOR.
JOSEPH A. HESEN
BY John B. Miller, Jr.
Agent

Dec. 7, 1965   J. A. HESEN   3,222,084
WHIPLASH-PREVENTING SAFETY DEVICE
Filed May 27, 1964   2 Sheets-Sheet 2
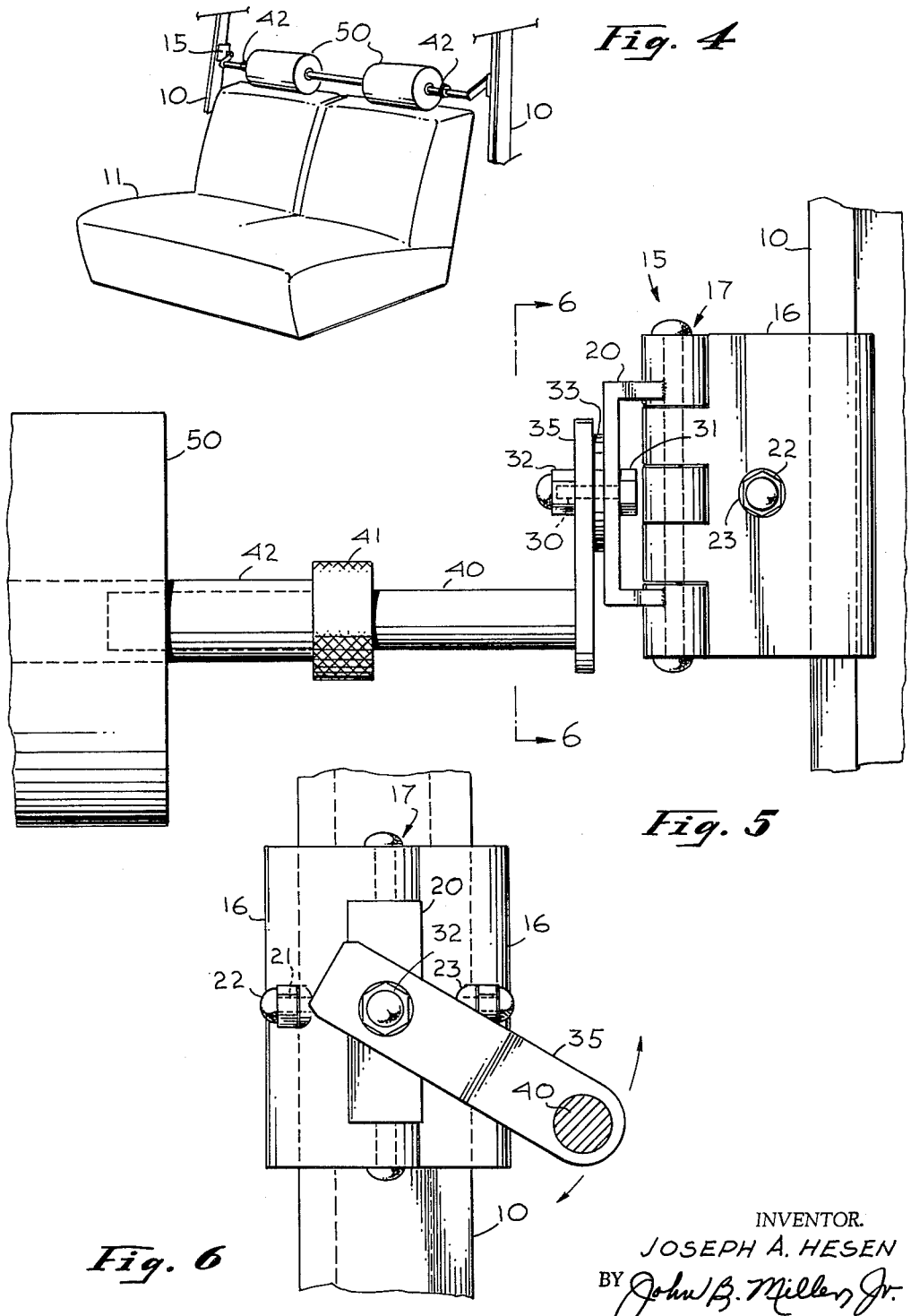
INVENTOR.
JOSEPH A. HESEN
BY John B. Miller, Jr.
Agent

United States Patent Office 3,222,084
Patented Dec. 7, 1965

3,222,084
WHIPLASH-PREVENTING SAFETY DEVICE
Joseph A. Hesen, Burbank, Calif., assignor to
John B. Miller, Jr., Glendale, Calif.
Filed May 27, 1964, Ser. No. 370,499
4 Claims. (Cl. 280—150)

The present invention relates to an automobile safety device and, more particularly, to a device for preventing whiplash injury to passengers in automobiles struck from the rear.

As is well known, one type of potentially serious injury that may be sustained when one's automobile is struck from the rear is that injury known in the medical profession as whiplash. Hospitals and clinics are constantly treating accident victims for this type injury. In such an accident, the force of the collision drives the head of one riding in the automobile backward, often so far as to cause the head to strike the upper portion of the seat itself. This sudden application of force extremely extends the muscles of the neck, resulting in the whiplash injury.

The courts each year are flooded with plaintiffs who claim to have been severely injured by whiplash as an actual and proximate result of a rear-end collision type of automobile accident. The injury is often difficult, at the time of the accident, to recognize because the victim is suffering from severe shock due to the accident. Because the injury often is not sufficiently recognized until a day or more has passed after the accident has occurred, the courts find it most difficult to determine, as a matter of fact, whether the injury has actually been sustained and, if so, how to assess damages and adequately compensate the injured party for his suffering.

Considering more than the immediate extent of the injury and the difficulty of the courts to compensate the injured party therefor, whiplash is an injury that may for years (and often for the lifetime of the injured party) may cause severe mental and physical suffering. Since the injury is one generally to the spinal column, often corrective treatment by competent medical people is insufficient to permanently relieve the pain and suffering sustained by the injured party. The one who has been unfortunate enough to have been riding in an automobile into which an unattentive driver has collided from the rear, knows only too well the physical hazards and misery accompanying such an accident.

The automobile industry, recognizing the extreme hazards of fast automotive traffic and the increasing concomitant risk of rear-end collisions, have provided (as custom equipment) many of their automobiles with headrests permanently affixed to the upright seat portion of the automobile. While, generally, these headrests provide protection for those motorists who are fortunate enough to be able to afford this custom accessory, the common motorist is more likely to be unable to afford the cost of this luxury and must, therefore, (even though he is able to afford the safety feature of seatbelts) go without any head-supporting safety device to protect him and his passengers from the injuries accompanying rear-end collisions.

Law enforcement agencies, who maintain freeway and turnpike cruising motor vehicles, have also recognized the dangers accompanying automobile collisions and have provided their patrol cars with airplane-type bucket seats which extend upward so as to provide a head-supporting back portion of the seat. This type seat best protects the driver and passenger of the patrol car from possible injuries arising out of rear-end collisions.

Because of the prohibitive cost of airplane bucket seats and factory-installed headrests, a number of custom accessory shops throughout the country have begun producing headrests which bolt to the back of the seat and extend upward so as to provide some support for the heads of those riding in the automobile. Still others have contrived various configurations of "do-it-yourself" installed headrests which merely clamp to the top of the seat. The latter type of, so-called, headrest is more a luxury headresting contrivance than a device which would actually support the head against a whiplash injury in the event of a rear-end collision. While these headrests seem to provide some protection, they are most often unstable and, in response to a suddenly applied force of the head, would easily give way and break from the seat portion. Such devices provide no support for the head but merely appear to do so.

The present inventor recognizing these and other disadvantages of the prior art rear-end collision head-supporting devices has turned his attention to devising an easily installed and low cost whiplash safety device, which is applicable to most automobiles. The present invention effectively resists the forces of the head thrust thereupon and supports the head and neck regions of persons riding in automobiles when involved in rear-end collisions. The present invention comprises an easily mountable headrest assembly which connects to the center posts (those structural braces of an automobile extending from the frame through the middle portion of the automobile to the automobile roof for partial support of the roof).

More specifically, in one basic embodiment of the invention a webbed strap is tautly and pivotally mounted between a pair of jaw clamps, each clamp being firmly attached to a center post. In the normal driving conditions, the webbing is oriented such that its maximum thickness is essentially in a parallel plane to the floor of the automobile but slightly inclined upward therefrom. This orientation of the web-type head-supporting device presents a minimum visual obstruction to the driver's vision through a rear-view mirror mounted centrally in the automobile. In response to a sudden impact to the rear of the automobile, normally the head of one riding in the automobile would be thrust backward, as hereinabove stated, often so far as to strike the top portion of the seat. The head is subsequently whipped forward causing injury to the neck and spinal column. However, in automobiles employing the present invention as a whiplash safety device, the head of one riding in the automobile goes back only so far as to come in contact with the webbing portion of the head rest. The webbing immediately, because of its slight inclination, tends to turn so that the maximum thickness of the webbing comes into flush contact with the back of the head and supports the head from moving any further to the rear.

A second embodimnet of the invention may employ the pair of jaw clamp assemblies described above as being firmly attached to the center posts. However, in place of the pivotally mounted webbing, an expandable pole assembly is movably fastened between the jaw clamps. On the pole assembly are appropriately positioned bolsters that will support the head in the event of a rear-end collision. The pole assembly is attached to the jaw clamps such that, when one's head is forced backward against the bolster, the bolster and pole move to the rear slightly to take up part of the shock. Having moved to this position, the headrest acts to protect the head and neck from whiplash injury. Thus, it will be apparent that substantial safety advantages are gained by employing the present invention in automobiles for the protection of the driver and passengers from serious injury in the event of rear-end collision.

It is, therefore, an object of the present invention to protect persons riding in automobiles from serious whiplash injuries which result from rear-end collision.

It is another object of the present invention to provide a whiplash safety device which is both low cost and easily installed.

It is still another object to the present invention to provide a whiplash safety device which presents a minimum visual obstruction to the driver of the vehicle viewing through a centrally mounted rear view mirror.

It is a further object of the present invention to provide a sturdy and easily adjustable whiplash safety device that is supported by the frame of the vehicle and not by the seat portions thereof.

The more important features of the invention have been broadly outlined to facilitate an understanding of the detailed description which follows and to assist in an appreciation of the contribution to the art. There are, of course, additional features of the invention that will be described hereafter and which will also form the subject of the claims appended hereto. Those skilled in the art will appreciate that the conception upon which this disclosure is based may be readily utilized as a basis for designing other structures for carrying out the several purposes of the invention. It is important, therefore, that the claims to be granted herein shall be of sufficient breadth to prevent the appropriation of this invention by those skilled in the art.

The novel features which are believed to be characteristic of the invention, both as to its organization and method of operation, together with further objects and advantages thereof, will be better understood from the following description considered in connection with the accompanying drawings in which two embodiments of the invention are illustrated by way of example. It is to be expressly understood, however, that the drawings are for the purpose of illustration and description only, and are not intended as a definition of the limits of the invention.

In the drawings:

FIGURE 4 illustrates a portion of an automobile (showing the seat portion thereof) wherein a second embodiment of the present invention is employed;

FIGURE 5 illustrates the clamp assembly previously illustrated in FIGURE 2 adapted for employment with the second embodiment of the invention illustrated in FIGURE 4; and FIGURE 6 is an auxiliary view of the clamp assembly portion of the second embodiment of the invention as illustrated in FIGURE 5.

Figure 1:
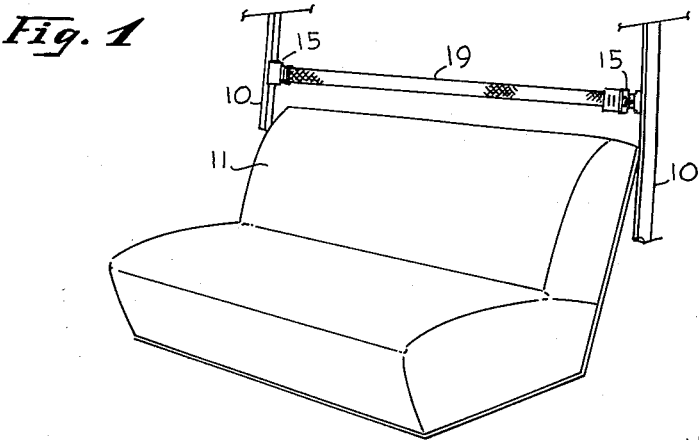
FIGURE 1 illustrates a portion of an automobile (showing the seat portion thereof) wherein one embodiment of the present invention has been employed between two frame members.

Referring now to the drawings, wherein like or corresponding parts are designated by similar reference characters throughout the several views, there is shown in FIGURE 1 one embodiment of whiplash-preventing safety device (constructed in accordance with the teachings of the present invention) which comprises a pair of jaw-like clamp assemblies 15, each firmly attached to a center post 10 of an automobile. Between the clamping assemblies 15 and above a passenger seat 11 of the automobile is tautly strung a non-elastic, webbed strap 19. As illustrated in FIGURE 1, the webbed strap 19 in its operative position is oriented such that its maximum thickness lies substantially in a plane perpendicular to the bench portion of the passenger seat 11. As will be described in greater detail hereinafter, a normal position of the strap 19 is such that its maximum thickness lies in a plane parallel to the bench portion of the seat 11. This normal position is maintained by means of a biasing spring and is useful in that the driver of the automobile who is sitting on the seat 11 and is viewing traffic to the rear through his rear-view mirror does not have his field of view obstructed by a wide thickness of webbing, but rather sees only the narrow thickness of the strap 19.

Figure 2:
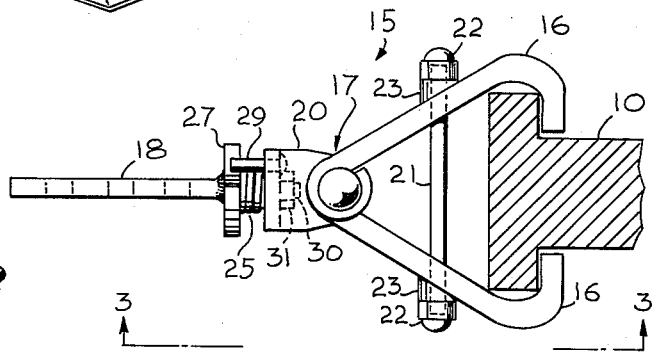
FIGURE 2 illustrates one form of clamp assembly that may be employed in the present invention.

One form of pivotal jaw clamp assembly 15 that may be employed in the present invention for supporting the strap 19 above the seat 11 is illustrated in FIGURE 2. More particularly, there is shown a pair of jaw clamp members 16 that grip the center post 10 and are held in a closed position by a bolt 21 passed through each clamp member 16 and secured thereto by means of a spacer 23 and a nut 22. The clamp members 16 are connected together by means of a hinge 17. To the hinge 17 is attached a bracket 20 which projects from the hinge and forms a support structure for a pivotal coupling. A keeper 18 for the strap 19 is pivotally coupled to the bracket 20 by means of a threaded shaft 30 that has been made an integral part of a cam 27 to which the keeper is welded. The shaft 30 is secured to the bracket 20 by means of a nut 31. A biasing element (a helical spring 25), having one end thereof secured to the cam 27 and the other end thereof secured to the bracket 20, is positioned between the cam 27 and the bracket member 20 and coaxially with the threaded shaft 30 for urging the cam 27 (and, thereby, the keeper 18) to the normal position displaced 90° from the position illustrated in FIGURE 2. Thus, in the normal position the keeper 18 would be positioned such that its maximum thickness would be parallel to the bench portion of the seat 11, illustrated in FIGURE 1.

In response to a sudden collision to the rear of the vehicle in which the present invention is employed, a person sitting in a normal relaxed position on the seat 11 would experience a sudden movement of his head to the rear, thereby coming in contact with the thin dimension of the strap 19. Because the normal resting position of the strap 19 is such that its maximum thickness is slightly inclined from a plane parallel to the bench of the seat 11 (on the order of 5°), a rotating action in the clamp assembly 15 is initiated whereby the cam 27 rotates to the position illustrated in FIGURE 2 and the non-elastic strap member 19 restrains the seat-occupant's head from moving any further to the rear. A stop 29, secured to the bracket 20, partially restrains the cam 27 from rotating farther than the position illustrated in FIGURE 2.

Figure 3:
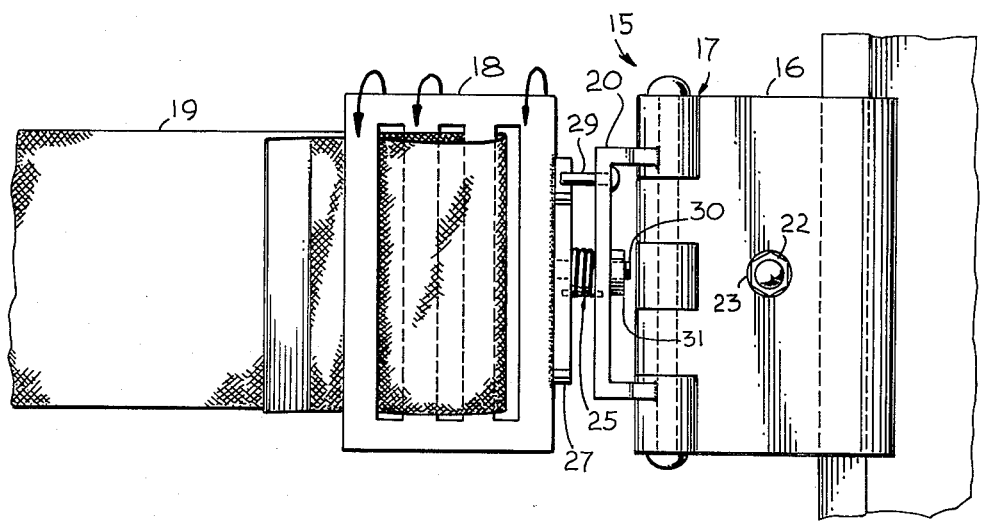
FIGURE 3 is a side view of the clamp assembly illustrated in FIGURE 2 having attached thereto one type of head supporting apparatus similar to that shown in FIGURE 1.

Referring now to FIGURE 3, there is shown a side view of the clamp assembly 15 illustrated in FIGURE 2, the strap member 19 illustrated as being connected to the keeper 18. It is readily apparent that the keeper 18 is rotated so as to be in the operative position of the invention, which rotation has substantially compressed the coils of the helical spring 25 on the shaft 30. After the rearward movement of the head has been resisted by the strap member 19 and the force on the strap member 19 withdrawn, the spring 25 rotates the keeper (in a direction illustrated by the arrows at the top of the keeper 18) to a position approximately 90° from the position illustrated in FIGURE 3. In accordance with the foregoing, this position is referred to as the normal position of the safety devise. In the event of a rear end crash, the rearward movement of a person's head will be effectively resisted by the non-elastic strap member 19; but in the normal position of the strap member 19, the safety device presents substantially no visual obstruction to the person's view.

Referring now to FIGURE 4, there is illustrated a second embodiment of the present invention of an easily installed whiplash-preventing safety device that may be positioned between frame members of an automobile. More particularly, between the center posts 10 of the automobile and above the seat 11 thereof is positioned the whiplash-preventing safety device of the present invention which, in this embodiment, comprises an expandable pole assembly 42 attached to the center posts 10 by means of the pivotal clamp assemblies 15. On the expandable pole assembly 42 is positioned a pair of bolster cushion-type headrests 50 that may be conveniently located at a level corresponding to the height of the head above the seat.

Referring with particularity to the second embodiment of the present invention as it is illustrated in FIGURE 5, it may be seen that the clamp assembly 15 has been modified for use with this embodiment by employing a moveably mounted arm 35 that is coupled to the bracket 20 by means of the threaded shaft 30. A lock-washer type spacer 33 is positioned between the bracket 20 and the arm 35 and coaxial with the shaft 30 for locking the arm member 35, in cooperation with a nut 32, in a predetermined position. It should be noticed that in FIGURE 5 a rod 40 having a first diameter is fixedly mounted to the arm 35 and is coaxial with the shaft 42 having a greater diameter than the first diameter. Moreover, the rod 40 is slidably engaged with the shaft 42 so that the assembly may be expanded or collapsed in order to fit substantially all widths of automobiles. When the desired width has been ascertained and the position of the rod 40 in the shaft 42 determined, a threaded lock coupling 41 is tightened down on the shaft 42 to firmly lock the rod 40 in register therewith.

Because of the various heights of people who may desire to use the invention, as illustrated in FIGURE 6, the inventor has made provision for varying the vertical position of the bolster cushions 50 by means of the rotatability of the arm 35. Should one desire to have the bolster cushion 50 in a higher position, the nut 32 may be loosened and the arm 35 raised to the desired position and the nut 32 tightened once again. A similar process is used to lower the bolster cushion 50. In the event of a rear end crash, the rider's head will be forced back against the bolster cushion 50 causing substantial force to be applied on the shaft 42 through the rod 40 to the arm 35. Such force may be sufficient to cause the arm 35 to rotate slightly about the shaft 30. But having a slight rotation acts to the advantage of the invention in that it absorbs part of the initial shock and gives time for the reflexes of the rider to respond and assist in resisting injurious rebound. Having moved to this position, the bolster 50 acts to protect the head and neck from whiplash injury.

It is to be understood that the above described arrangements are illustrative of the application of the principles of the invention. Numerous other arrangements may be devised by those skilled in the art without departing from the spirit and scope of the invention. Thus, by way of example and not of limitation, other types of rotatable couplings may be used to affix the headrests of the present invention to the frame members of the automobile. It should be noticed that, with regard to the second embodiment of the invention illustrated, the arm member 35 may be fitted with a rubber foot in place of the pivotal clamp assembly 15 at the location of the lock washer 33. In such an event, the expandable pole assembly would be merely pressure fitted between the center posts 10 and would rotate slightly about the rubber foot assembly. Still further, in the strap-embodiment of the invention, other forms of keeper may be utilized to restrain the strap to the clamp assembly and, in place of the cam and bias spring arrangement of rotatable couplings, ball-joint bearings or the like may be used. Accordingly, from the foregoing it is evident that various changes may be made in the structure used to mechanize the present invention without departing from the spirit and scope of the invention. It is intended, therefore, that the invention be limited only by the scope of the appended claims.

What is claimed as new is:

1. A whiplash-preventing safety device for use above an automobile seat, said safety device comprising:
    a non-elastic support means positioned above the automobile seat, said support means including a collapsible pole assembly having a plurality of bolster members positionable above the seat so as to support the head of a person occupying the seat; and
    clamp means for pivotally attaching said support means between frame members of the automobile, each of said clamp means including a jaw clamp having a pair of hinged clamp members for gripping the automobile frame member and a lever arm rotatably coupled to said pair of hinged clamp members for gripping said support means.

2. A whiplash-preventing safety device for use above an automobile seat, said safety device comprising:
    a non-elastic support means including an expandable pole assembly having a shaft and a plurality of bolster cushion members positioned on said shaft, the position of said bolster members on said shaft being adjustable for locating the bolster cushion in a desired position above the automobile seat;
    clamp means for firmly gripping frame members of the automobile; and
    rotatable coupling means interposed between said clamp means and said support means for pivotally connecting said support means to said clamp means and for rigidly maintaining by longitudinally applied forces said support means between the frame members of the automobile.

3. The whiplash-preventing safety device as described in claim 2 wherein said coupling means includes a lever arm rotatably coupled to said clamp means and a rod member attached to said lever arm, said rod member being coaxial with said shaft and slidably engaged with said shaft, said coupling means further including a lock-nut assembly for securing said rod member in a preselected position within said shaft.

4. A whiplash-preventing safety device for use above an automobile seat, said safety device comprising:
    clamp means for gripping frame members of the automobile;
    a first shaft rotatably coupled to said clamp means;
    a second shaft slidably engaged with said first shaft and coaxial therewith;
    locking means for rigidly securing said first shaft to said second shaft; and
    a pair of bolster cushions positioned on said second shaft for supporting the heads of persons seated on the automobile seat.

References Cited by the Examiner
UNITED STATES PATENTS

| | | | |
|---|---|---|---|
| 1,781,600 | 11/1930 | Quisling | 297—395 |
| 2,765,840 | 10/1956 | Robert et al. | 297—403 |
| 2,833,554 | 5/1958 | Ricordi | 280—150 |
| 2,854,248 | 9/1958 | Stocker | 297—385 |
| 2,973,029 | 2/1961 | Scholsstein | 297—391 |
| 3,022,089 | 2/1962 | Botar | 297—395 |
| 3,129,017 | 4/1964 | Graham | 280—150 |

FOREIGN PATENTS 582,985   1/1925   France.

FRANK B. SHERRY, *Primary Examiner.*

C. A. NUNBERG, *Assistant Examiner.*